US009293137B2

United States Patent
Kawamura et al.

(10) Patent No.: US 9,293,137 B2
(45) Date of Patent: Mar. 22, 2016

(54) APPARATUS AND METHOD FOR SPEECH RECOGNITION

(71) Applicant: Akinori Kawamura, Tokyo (JP)

(72) Inventors: Akinori Kawamura, Tokyo (JP); Masaru Sakai, Tokyo (JP); Kazushige Ouchi, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 240 days.

(21) Appl. No.: 13/693,753

(22) Filed: Dec. 4, 2012

(65) Prior Publication Data

US 2014/0088967 A1 Mar. 27, 2014

(30) Foreign Application Priority Data

Sep. 24, 2012 (JP) ................................. 2012-209151

(51) Int. Cl.
G10L 15/30 (2013.01)
G10L 15/02 (2006.01)
G10L 15/06 (2013.01)
G10L 15/183 (2013.01)

(52) U.S. Cl.
CPC ................. *G10L 15/30* (2013.01); *G10L 15/02* (2013.01); *G10L 15/183* (2013.01); *G10L 2015/0635* (2013.01)

(58) Field of Classification Search
CPC ..................................................... G10L 15/30
USPC ................................................ 704/231–247
See application file for complete search history.

(56) References Cited

U.S. PATENT DOCUMENTS

| 7,437,296 | B2 | 10/2008 | Inoue et al. | |
| 7,809,562 | B2 | 10/2010 | Hanazawa | |
| 7,933,777 | B2 | 4/2011 | Koll | |
| 8,249,877 | B2 | 8/2012 | Koll | |
| 2003/0139924 | A1* | 7/2003 | Balasuriya | 704/231 |
| 2007/0162282 | A1* | 7/2007 | Odinak | 704/255 |
| 2009/0055185 | A1* | 2/2009 | Nakade et al. | 704/257 |
| 2011/0161077 | A1* | 6/2011 | Bielby | 704/231 |
| 2012/0179467 | A1* | 7/2012 | Williams | 704/249 |
| 2012/0296644 | A1 | 11/2012 | Koll | |

FOREIGN PATENT DOCUMENTS

| JP | 2001142488 | 5/2001 |
| JP | 2001337695 | 12/2001 |
| JP | 2004012653 | 1/2004 |
| JP | 2004-295102 | 10/2004 |

(Continued)

OTHER PUBLICATIONS

Office Action of Notification of Reasons for Refusal for Japanese Patent Application No. 2012-209151 Dated Jul. 11, 2014, 6 pgs.

*Primary Examiner* — Douglas Godbold
(74) *Attorney, Agent, or Firm* — Amin, Turocy & Watson, LLP

(57) ABSTRACT

Apparatus for speech recognition includes a recognition unit configured to recognize a speech signal and to generate a first recognition result, a transmitting unit that transmits at least one of the speech signal and a recognition feature to a server, a receiving unit that receives a second recognition result from the server, a result generating unit configured to generate a third recognition result, a result storage unit that stores the third recognition result and a dictionary update unit configured to update the client recognition dictionary.

8 Claims, 11 Drawing Sheets

(56) References Cited

FOREIGN PATENT DOCUMENTS

| JP | 2007-033901 | 2/2007 |
| JP | 2012-501480 | 1/2012 |
| WO | 2010-025440 | 3/2010 |

* cited by examiner

APPARATUS AND METHOD FOR SPEECH RECOGNITION

CROSS-REFERENCE TO RELATED APPLICATION

This application is based upon and claims the benefit of priority from Japanese Patent Application No. 2012-209151 filed on Sep. 24, 2012, the entire contents of which are incorporated herein by reference.

FIELD

Embodiments described herein relate generally to an apparatus and a method for speech recognition.

BACKGROUND

Recently, a speech recognition system that both a server and a client have a function of speech recognition has been proposed. In this system, first, the client which does not need a network connection starts to recognize a user speech. If the client cannot recognize the user speech (typically due to the processing limitations of the client device), then, the server starts to recognize the user speech by utilizing high computing power. Moreover, the system tries to increase the ratio of vocabularies which the client can recognize by adding vocabularies which are included in the recognition result of the server into the recognition dictionary of the client. The result is an improvement of response speed for the whole system.

When recognition accuracy of the client is low, however, the conventional system always needs to execute the recognition process in the server and the response speed of the whole system is deteriorated. There is a limitation to the number of vocabularies which the recognition dictionary of the client can register. The conventional system determines the vocabularies which are registered into the recognition dictionary of the client based on the frequency of utterances by the user. Therefore, it is difficult to register a new vocabulary which is recently uttered by the user when there are older vocabularies which are uttered many times in the past.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION

Figure 1:
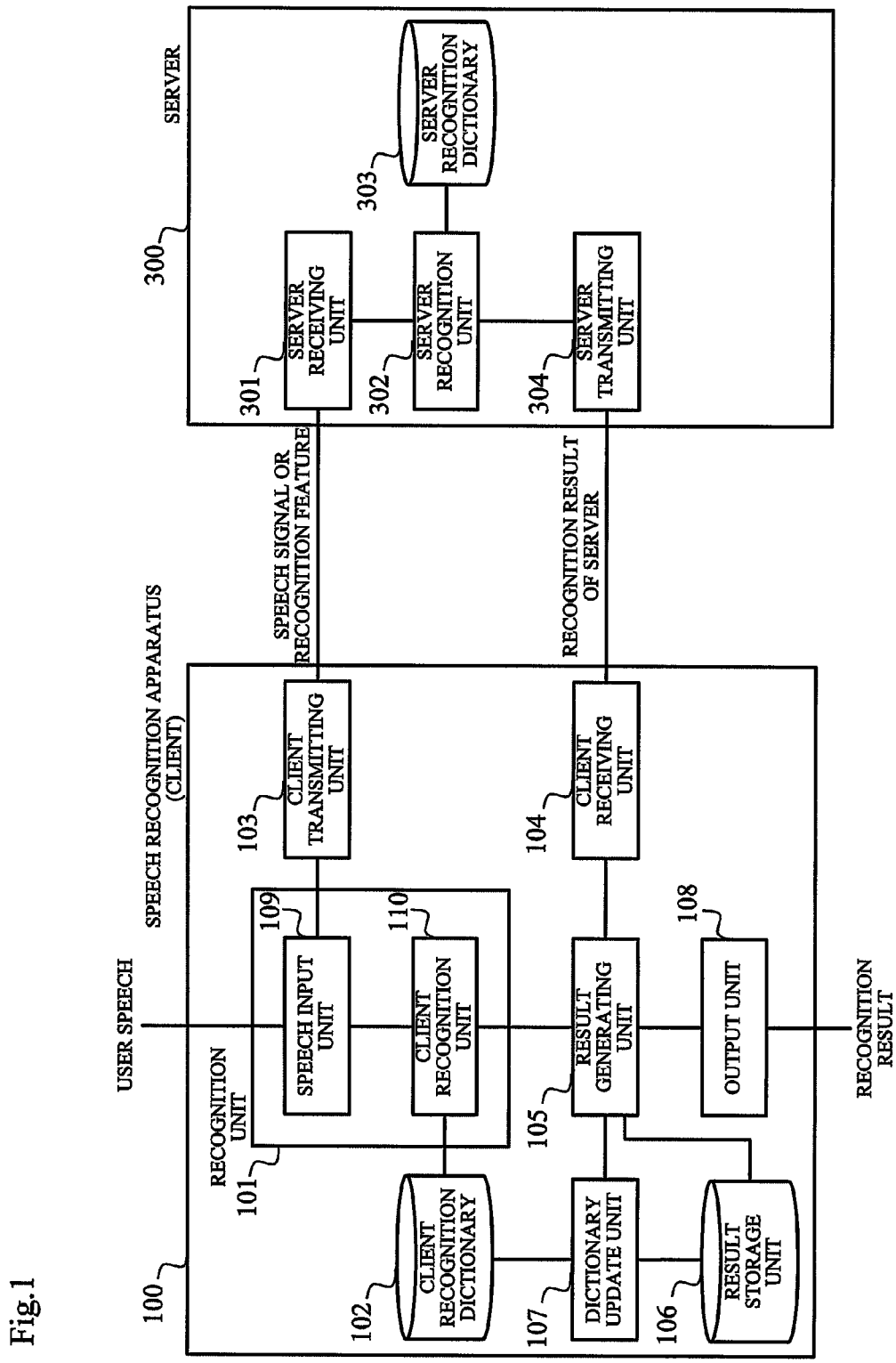
FIG. 1 is a block diagram of a speech recognition system according to a first embodiment.

According to one embodiment, an apparatus for speech recognition contains a recognition unit, a transmitting unit, a receiving unit, a result generating unit, a result storage unit and a dictionary update unit. The recognition unit recognizes a speech signal by utilizing a client recognition dictionary and generates a first recognition result. The client recognition dictionary includes vocabularies recognizable in the recognition unit. The transmitting unit transmits at least one of the speech signal and a recognition feature extracted from the speech signal to a server before the first recognition result is generated by the recognition unit. The receiving unit receives a second recognition result from the server. The second recognition result is generated by the server. The result generating unit generates a third recognition result which is generated by utilizing the first recognition result when the first recognition result is generated before receiving the second recognition result, otherwise by at least utilizing the second recognition result. The result storage unit stores the third recognition result. The dictionary update unit updates the client recognition dictionary by utilizing a history of the third recognition result. The dictionary update unit updates the client recognition dictionary so that the client recognition dictionary includes a first vocabulary prior to a second vocabulary in the case that the history of the third recognition result includes both the first and the second vocabularies and the second vocabulary is generated before the first vocabulary.

Various embodiments will be described hereinafter with reference to the accompanying drawings, wherein the same reference numeral designations represent the same or corresponding parts throughout the several views.

The First Embodiment

The first embodiment describes a speech recognition apparatus (client) for recognizing a user speech by utilizing a server. The apparatus itself executes a recognition process without utilizing network connection and also makes the server execute a recognition process. When the apparatus generates a recognition result by its recognition process, the apparatus outputs the recognition result to the user without waiting to receive a recognition result from the server. Moreover, the apparatus according to this embodiment updates its recognition dictionary so that vocabularies which are more recently uttered by the user become recognizable by the recognition process of the apparatus itself. Accordingly, the apparatus can improve response speed as well as recognition accuracy.

FIG. 1 is a block diagram of a speech recognition system. This system contains a speech recognition apparatus 100 (client) and a server 300. The apparatus 100 and the server 300 communicate across network. In FIG. 1, the apparatus 100 and the server 300 execute one-to-one communication. However, the server 300 may communicate with a plurality of speech recognition apparatuses or clients.

The server 300 can achieve high recognition accuracy compared to the apparatus 100 because of its superior computing power. On the other hand, the sever 300 requires a communication with the apparatus 100 via network for recognizing the user speech. The communication causes a time delay until the apparatus 100 receives a recognition result from the server 300.

The apparatus 100 of FIG. 1 contains a recognition unit 101, a client recognition dictionary 102, a client transmitting unit 103, a client receiving unit 104, a result generating unit 105, a result storage unit 106, a dictionary update unit 107 and an output unit 108. The recognition unit 101 contains a speech input unit 109 and a client recognition unit 110.

The server 300 of FIG. 1 contains a server receiving unit 301, a server recognition unit 302, a server recognition dictionary 303 and a server transmitting unit 304.

(Hardware Component)

Figure 2:
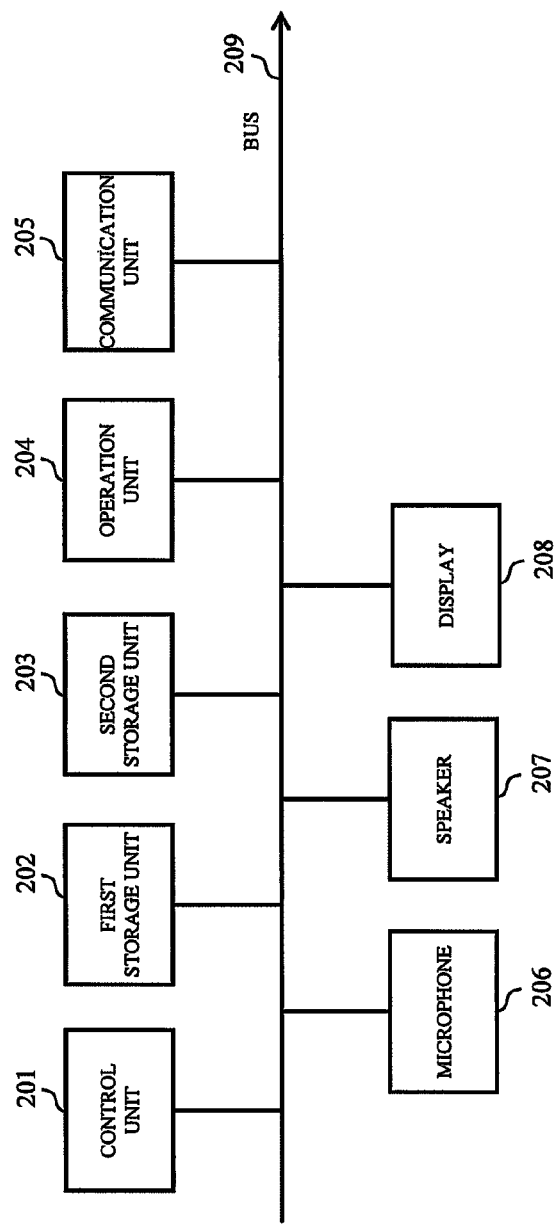
FIG. 2 is a system diagram of a hardware component of a speech recognition apparatus.

The apparatus 100 and the server 300 are composed of hardware using a regular computer shown in FIG. 2. This hardware contains a control unit 201 such as a CPU (Central Processing Unit) to control the entire computer, a first storage unit 202 such as a ROM (Read Only Memory) and/or a RAM (Random Access Memory) to store various kinds of data and programs, a second storage unit 203 such as a HDD (Hard Access Memory) and/or a CD (Compact Disk) to store various kinds of data and programs, an operation unit 204 such as a keyboard, a mouse, and/or a touch screen to accept a user's indication, a communication unit 205 to control communication with an external apparatus, a microphone 206 to which a user speech is input, a speaker 207 to output sound such as synthesized speech, a display 208 to display a image and a bus 209 to connect the hardware elements. The apparatus 100 can be a mobile or a desktop computer.

In such hardware, the control unit 201 executes one or more programs stored in the first storage unit 202 (such as the ROM) and/or the second storage unit 203. As a result, the following functions are realized.

(Function)

First, the function of the apparatus 100 is explained.

The recognition unit 101 contains the speech input unit 109 and the client recognition unit 100. The recognition unit 101 recognizes a user speech by utilizing the client recognition dictionary 102.

The speech input unit 109 obtains a speech signal by applying an A/D conversion to the user speech inputted to the microphone 206. The speech input unit 109 can compress the speech signal. The speech input unit 109 extracts a recognition feature such as MFCC (Mel Frequency Cepstral Coefficient) from the speech signal.

The client transmission unit 103 transmits the speech signal or the recognition feature to the server 300 via the communication unit 205. Here, the client transmission unit 103 transmits the speech signal or the recognition feature before finishing the recognition process of the client recognition unit 101.

The client receiving unit 104 receives the recognition result of the speech signal by the server 300 via the communication unit 205. The recognition process of the server 300 is explained later.

The client recognition unit 110 executes a recognition process by making a comparison between the recognition feature extracted by the speech input unit 109 and the client recognition dictionary 102. The client recognition unit 110 outputs a notice of rejection when there is no appropriate recognition result, and outputs a recognition result with a confidence score when there is an appropriate one. Here, the confidence score represents a likelihood of the recognition result generated by the client recognition unit 110. The higher confidence score indicates that the corresponding recognition result is more reliable than a recognition result with a lower confidence score. The client recognition unit 110 can generate the recognition result which includes top M candidates (M is greater than or equal to one) based on the confidence score.

The client recognition dictionary 102 contains an acoustic model and a language model. The acoustic model defines acoustic feature of each phoneme. The language model defines recognizable vocabularies, sequences of phonemes and sequences of words of each vocabulary. As for the acoustic model, HMM (Hidden Markov Model) is utilized. The HMM comprises GMM (Gaussian Mixture Model) of the acoustic feature. As for the language model, a statistical language model or a rule-based grammar is utilized. The statistical language model defines statistically the probability of occurrence of words and word sequences and the rule-based grammar defines word sequences explicitly by work network. The client recognition dictionary 102 is stored on the first storage unit 202 or the second storage unit 203.

The result generating unit 105 generates a recognition result which the apparatus 100 outputs to a user or any other applications by utilizing at least one of the recognition result of the client recognition unit 110 and the recognition result of the server 300. The process of the result generating unit 105 is explained later.

The result storage unit 106 stores the recognition result generated by the result generating unit 105. The result storage unit 106 can consist of the first storage unit 202 or the second storage unit 203.

The dictionary update unit 107 updates the client recognition dictionary 102 by utilizing a history of the recognition results stored in the result storage unit 106. The dictionary update unit 107 updates the client recognition dictionary 102 so that vocabularies which are more recently or lately uttered by the user become recognizable by the client recognition unit 110. The history of the recognition results represents a list of the recognition results which are generated by the result generating unit 105. In this embodiment, moreover, the history of the recognition results also represents an appearance frequency calculated by the list of the recognition results and a time information such as a time when the recognition results were uttered.

The output unit 108 outputs the recognition result generated by the result generating unit 105. Here, the output unit 108 displays the recognition result on the display 208. The output unit 108 can play synthesized speech of the recognition result by utilizing speech synthesis technique and can output the recognition result to another application.

Next, the function of the server 300 is explained.

The server receiving unit 301 receives the speech signal or the recognition feature transmitted from the apparatus 100.

The server recognition unit 302 generates a recognition result of the server 300 by making a comparison between the recognition feature and the server recognition dictionary 303. The server recognition unit 302 extracts the recognition feature from the speech signal when the server receiving unit 301 receives the speech signal instead of the recognition feature. The server recognition unit 302 can generate the recognition result which includes top M candidates (M is greater than or equal to one) based on the confidence score.

The server recognition unit 302 can execute the comparison between the acoustic feature and the server recognition dictionary 303 accurately because of its high computing power. Therefore, the server recognition unit 302 can achieve better recognition performance compared to the client recognition unit 110.

The composition of the server recognition dictionary 303 is the same as the client recognition dictionary 102. The language mode of the server recognition dictionary 303 defines recognizable vocabularies in the server 300. Generally, many recognizable vocabularies need many comparisons in the server recognition unit 302 and huge memory to store the server recognition dictionary 303. The server 300 can utilize both superior computing power and markedly larger capacity memory compared to the apparatus 100 whose hardware is a mobile computer. The server recognition dictionary 303 can include many recognizable vocabularies compared to the client recognition dictionary 102.

The server transmitting unit 303 transmits the recognition result generated by the server recognition unit 302 to the apparatus 100.

(Flow Chart)

Figure 3:
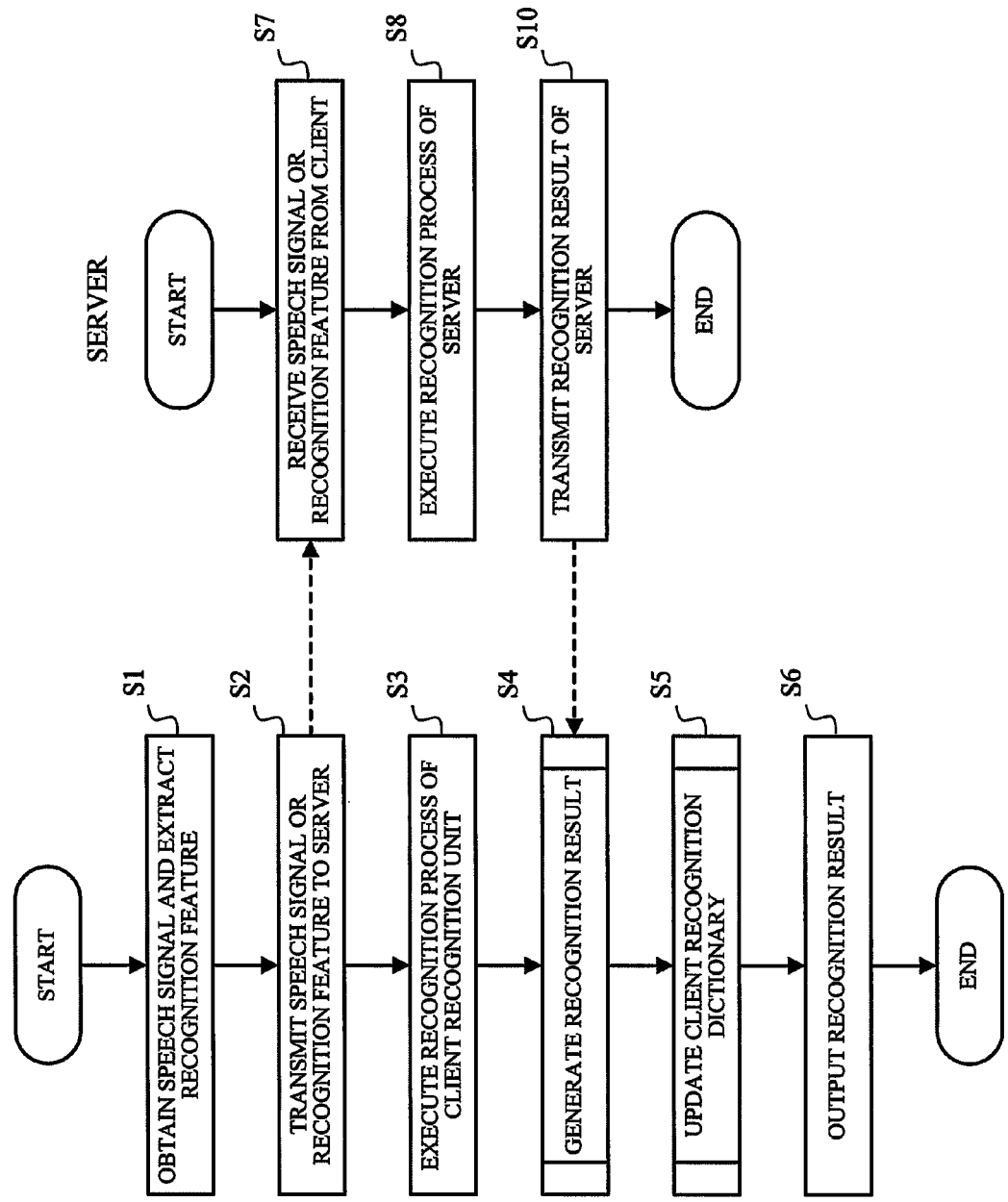
FIG. 3 is a system diagram of a flow chart illustrating processing of the speech recognition system according to the first embodiment.

FIG. 3 is a flow chart of processing of the speech recognition system according to this embodiment. The steps from S1 to S6 and the steps from S7 to S9 represent the process of the apparatus 100 and the process of the server 300, respectively.

At S1, the speech input unit 109 obtains the speech signal and extracts the recognition feature such as MFCC from the speech signal.

At S2, the client transmitting unit 103 transmits the speech signal or the recognition feature to the server 300. Here, the client transmitting unit 103 transmits the speech signal or the recognition feature before finishing the recognition process of the client recognition unit 110.

At S3, the client recognition unit 100 executes the recognition process by utilizing the recognition feature extracted at S1.

At S7, the server receiving unit 301 receives the speech signal or the recognition feature transmitted by the apparatus 100.

At S8, the server recognition unit 302 executes the recognition process by utilizing the speech signal or the recognition received at S7.

At S9, the server transmitting unit 304 transmits the recognition result generated by the server recognition unit 302 to the apparatus 100.

At S4, the result generating unit 105 generates the recognition result which the apparatus 100 outputs to the user by utilizing at least one of the recognition result of the client recognition unit 110 at S3 and the recognition result of the server recognition unit 302 at S8. The details of S4 is explained later.

At S5, the dictionary update unit 108 updates the client recognition dictionary 102 by utilizing the history of the recognition results generated at S4. The dictionary update unit 108 updates the client recognition dictionary 102 so that vocabularies which are lately uttered by the user are become recognizable by the client recognition unit 110. The details of S5 are explained later.

At S6, the output unit 108 displays the recognition result on the display 208.

(Flow Chart of S4)

Figure 4:
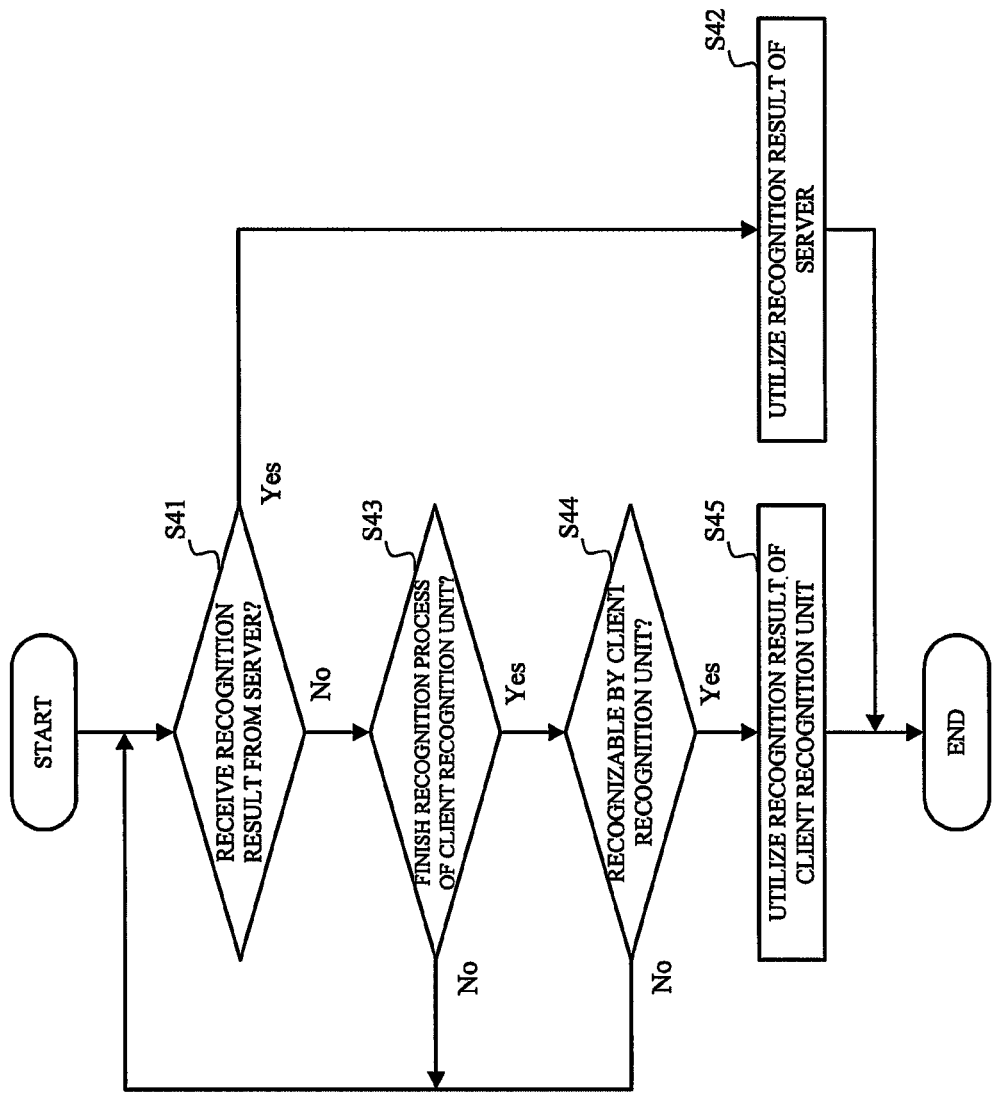
FIG. 4 is a system diagram of a flow chart illustrating processing of the apparatus.

FIG. 4 is a flow chart of processing of the result generating unit 105 at S4.

At S41, the result generating unit 105 judges whether or not the client receiving unit 104 receives the recognition result of the server 300. When the client receiving unit 104 receives, the process moves to S42.

At S42, the result generating unit 105 generates the recognition result which the apparatus 100 outputs to the user by utilizing the recognition result of the server 300. The result generating unit 105 can utilize the recognition result of the server 300 as the recognition result which the apparatus 100 outputs to the user without any change. When the server 300 generates top M candidates (M is greater than or equal to one), the result generating unit 105 can utilize a first candidate whose confidence score is the highest among those generated and output the first candidate to the following output unit 108.

When the client receiving unit 104 does not receive the recognition result of the server ("No" at S41), the process moves to S43.

At S43, the result generating unit 105 judges whether or not the client recognition unit 110 finishes its recognition process. If the recognition process is not finished, the process moves to S41 and result generating unit 105 checks the reception status of the recognition result of the server 300. Otherwise, the process moves to S44.

At S44, the result generating unit 105 judges whether or not the client recognition unit 110 can recognize the speech signal. Here, the result generating unit 105 judges as recognizable when the client recognition unit 110 does not output the notice of rejection but the recognition result. The client recognition unit 110 can judge as recognizable when the confidence score of the recognition result exceeds a certain threshold. If the client recognition unit 110 cannot recognize the speech signal, the process moves to S41 in order to obtain the recognition result from the server 300. Otherwise, the process moves to S45.

At S45, the result generating unit 105 generates the recognition result which the apparatus 100 outputs to the user by utilizing the recognition result of the client recognition unit 110. Here, the result generating unit 105 utilizes the recognition result of the client recognition unit 101 without any change. When the client recognition unit 110 generates top M candidates (M is greater than or equal to one), the result generating unit 105 can utilize a first candidate whose confidence score is the highest among those generated and output the first candidate to the following output unit 108.

In this way, the apparatus 100 according to this embodiment outputs the recognition result without waiting to receive the recognition result from the server 300 when the recognition process of the client recognition unit 100 finishes faster than the recognition process of the server 300 and the client recognition unit 100 can recognize the speech signal. Accordingly, the apparatus 100 can improve both response speed as well as recognition accuracy. Conventionally, either response speed or recognition accuracy can be improved, not both.

Figure 5:
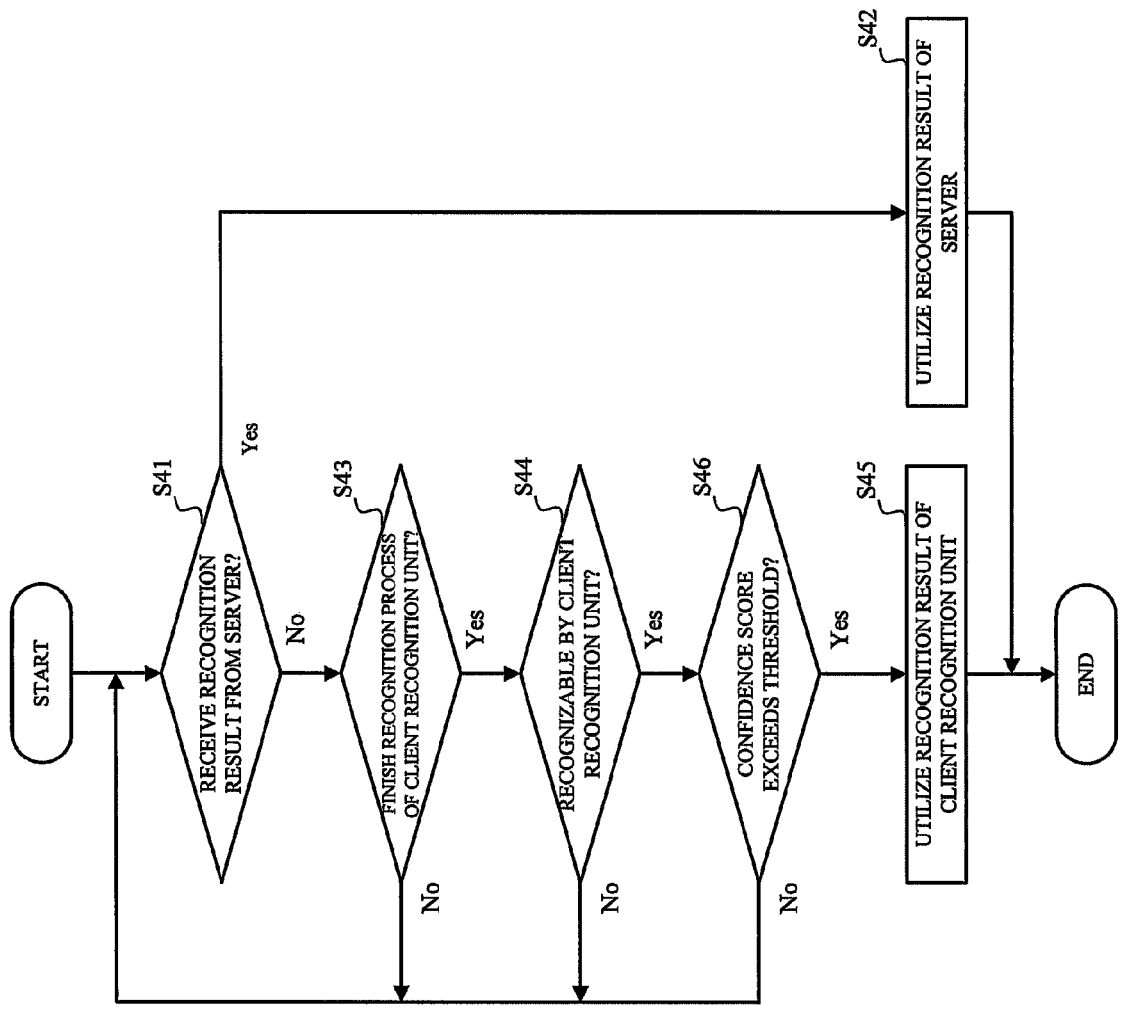
FIG. 5 is a system diagram of a flow chart illustrating processing of the apparatus.

FIG. 5 is another flow chart of processing of the result generating unit 105 at S4. The difference from FIG. 4 is that this flow chart includes S46.

At S46, the result generating unit 105 utilizes the recognition result of the client recognition unit 110 when its confidence score exceeds a certain threshold. Otherwise, it waits until the apparatus 100 receives the recognition result from the server 300. By introducing the threshold processing regarding the confidence score, the apparatus 100 can output a more reliable recognition result to the user among the recognition results of the client recognition unit 110.

(Flow Chart of S5)

Figure 6:
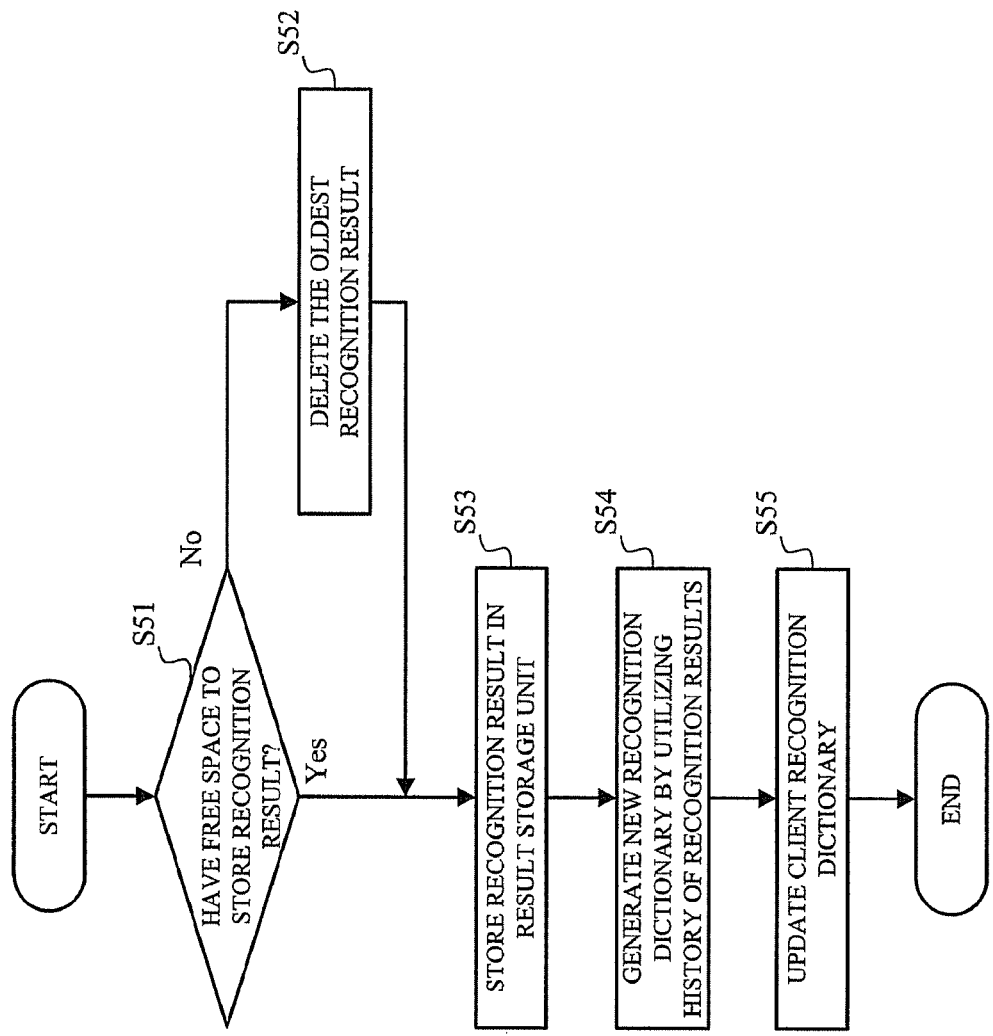
FIG. 6 is a system diagram of a flow chart illustrating processing of the apparatus.

FIG. 6 is a flow chart of processing at S5.

At S51, the result generating unit 105 judges whether or not the result storage unit 106 has adequate free space to store the recognition result generated at S4. If the result storage unit 106 has adequate free space, the process moves to S53 and the result storage unit 106 stores the recognition result. Otherwise, the result storage unit 106 stores the recognition result after deleting the oldest recognition result stored in the result storage unit 106 (S52 and S53). This history management can be achieved by ring buffer.

At S54, the dictionary update unit 107 generates a new recognition dictionary by utilizing the history of the recognition results stored in the result storage unit 106. In particular, the dictionary update unit 107 generates a new language model which defines vocabularies included in the history of the recognition results as recognizable vocabularies for the client recognition unit 110. The dictionary update unit 107 can also generate a new language model by increasing the probability of occurrence of the vocabularies included in the history. The dictionary update unit 107 utilizes an adaptive technique for language model.

At S55, the dictionary update unit 107 replaces the existing client recognition dictionary 102 with the recognition dictionary generated at S54.

The result generating unit 105 can define that the result storage unit 106 can only store the last N recognition results (N is counting number; that is, a positive integer). By controlling N appropriately, the dictionary update unit 107 can update the client recognition dictionary 102 by utilizing the history of the last N recognition results. In this way, the dictionary update unit 107 can update the client recognition dictionary 102 so that lately uttered vocabularies are become recognizable by the client recognition unit 110 even if there are vocabularies which were uttered many times before the last N utterances. As for the vocabularies which are uttered by user lately, the recognition result of the client recognition unit 110 is utilized without waiting the recognition results of the server 300. As for the other vocabularies, the recognition result of the server 300 is utilized. Accordingly, the apparatus 100 can improve response speed as well as recognition accuracy.

The result generating unit 105 can store the last K recognition results (K is greater than N) in the result storage unit 106 and the dictionary update unit 107 can utilize only the last N recognition results among all the recognition results for the generation of the recognition dictionary.

Figure 7:
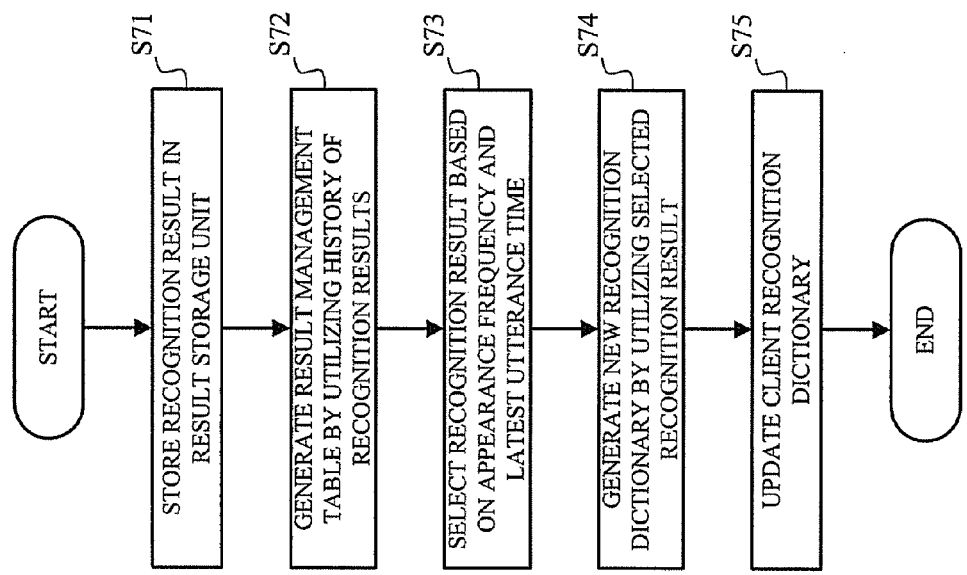
FIG. 7 is a system diagram of a flow chart illustrating processing of the apparatus.

FIG. 7 is another flow chart of processing at S5.

At S71, the result generating unit 105 stores the recognition result generated at S4 in the result storage unit 106.

At S72, the dictionary update unit 107 generates a result management table by utilizing the history of the recognition results. The result management table has information about the appearance frequency and the latest utterance time of the recognition results. The result management table can be stored in the result storage unit 106.

Figure 8:
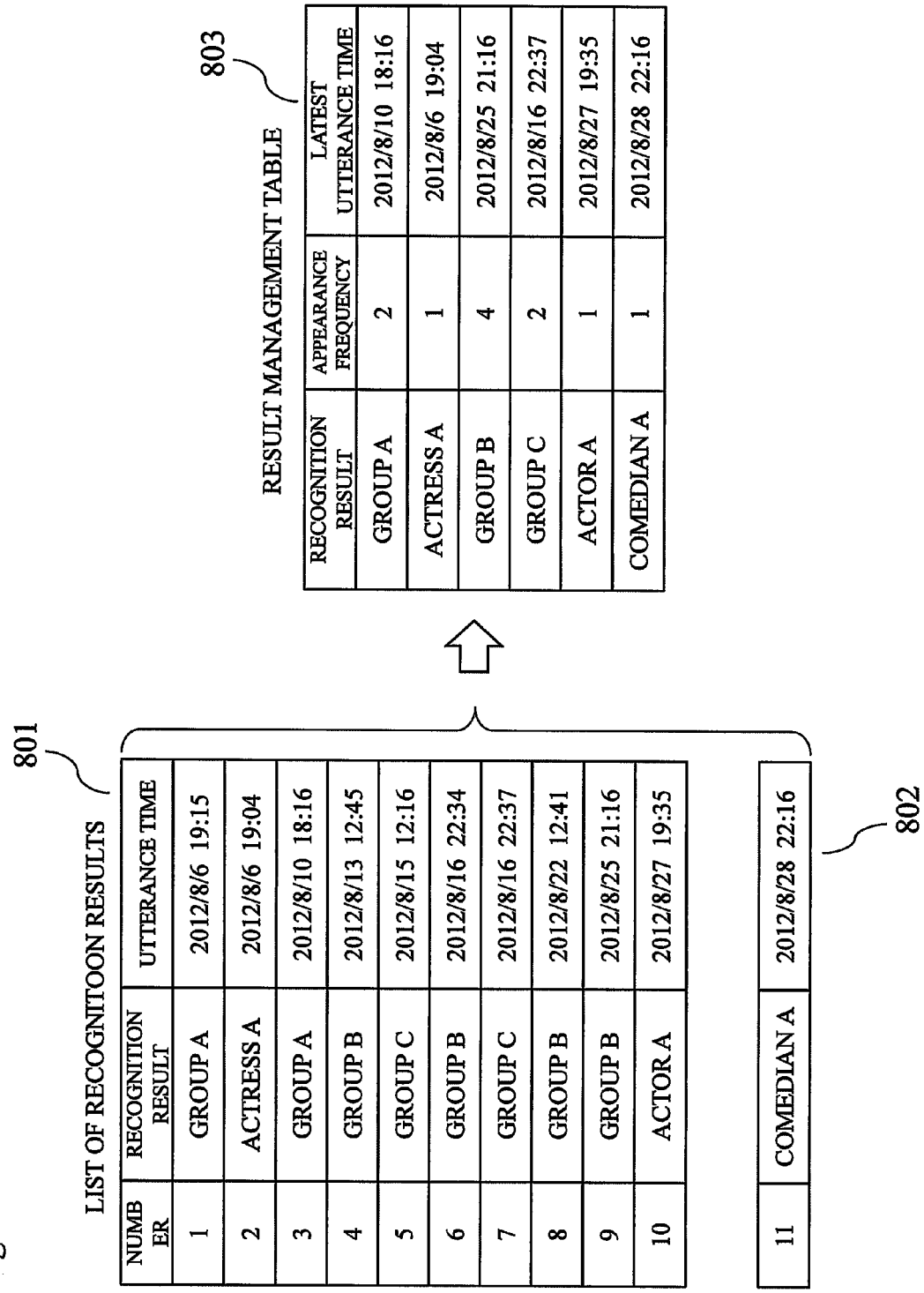
FIG. 8 is an example of a history of recognition results and a result management table according to the first embodiment.

FIG. 8 is an example of the history of the recognition results and a result management table according to the first embodiment.

In this example, the result storage unit has already stored the list of last ten recognition results 801 and the result storage unit stores the new recognition result 802. The "NUMBER" of the list 801 is a sequential number which shows the order of the recognition results. The "UTTERANCE TIME" is a time when the utterance corresponding to the recognition result was uttered by the user. The "UTTERANCE TIME" can be measured by the time when the speech input unit 109 obtains the speech signal or the time when the recognition results is generated by the result generating unit 105. This example shows that the user uttered "GROUP A" at 6:16 p.m. on Aug. 10, 2012.

At S72, the dictionary update unit 107 generates the result management table 803 by utilizing the list 801. The "APPEARANCE FREQUENCY" is the number of times that each recognition result appears in the list 801. The "LATEST UTTERANCE TIME" is the utterance time when the utterance corresponding to the recognition results was uttered last time. This example shows that "GROUP B" was appeared in the list 801 four times and was uttered by the user at 9:16 p.m. on Aug. 25, 2012 last time.

At S73, the dictionary update unit 107 selects recognition results which are utilized for generating the recognition dictionary from the result management table. In particular, when the dictionary update unit 107 generates the recognition dictionary, the dictionary update unit 107 deletes the recognition result both whose latest utterance time is before a certain time and whose appearance frequency is lower than a certain threshold. For example, if the dictionary update unit 107 sets to delete the recognition results both whose latest utterance time is before at 12:00 noon on Aug. 11, 2012 and whose appearance frequency is lower than two, "ACTRESS A" is not utilized for generation the recognition dictionary in FIG. 8.

If the threshold regarding the appearance frequency is set to zero, the dictionary update unit 107 can select the recognition results by only utilizing the last utterance time. The dictionary update unit 107 can also select the recognition results based on the "NUMBER" instead of the "LATEST UTTERANCE TIME". In this case, for example, the dictionary update unit 107 can select the recognition results whose number is smaller than five. The dictionary update unit 107 can also utilize the probability of occurrence calculated by the list as the appearance frequency.

At S74, the dictionary update unit 107 generates the new recognition dictionary by utilizing the selected recognition results as S73.

At S75, the dictionary update unit 107 replaces the existing client recognition dictionary 102 with the recognition dictionary generated at S74.

By deleting the recognition results whose latest utterance time is before the certain time, the dictionary update unit 107 can update the client recognition dictionary so that lately uttered vocabularies are become recognizable by the client recognition unit 110.

Figure 9:
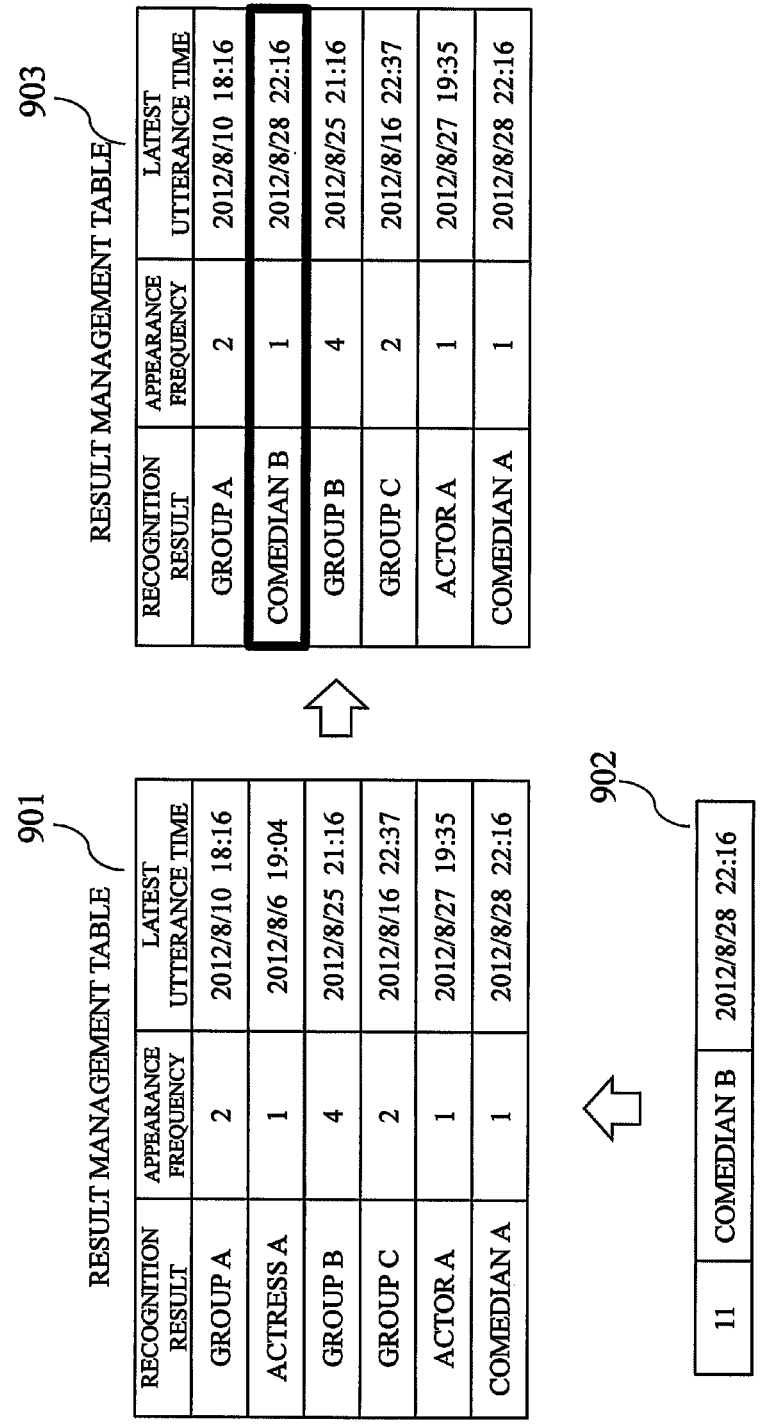
FIG. 9 is an example of a result management table according to the first embodiment.

The result storage unit 106 can store the result management table and the result generating unit 105 updates the result management table every time when the result generating unit 105 generates the new recognition result. For example, in FIG. 9, the result management table 901 has already been stored in the result storage unit 106 and the new recognition result 902 is generated. In the case that the result management table 901 can only manage six recognition results because of the storage limitation, the result generating unit 105 deletes the recognition result of "ACTRESS A" whose latest utterance time is before at 12:00 noon on Aug. 11, 2012 and whose appearance frequency is lower than two from the result management table 105. And, the result generating unit 105 generates the new result management table 903 by adding "COMEDIAN A". The dictionary update unit 107 updates the client recognition dictionary 102 by utilizing the recognition results included in the result management table 903. When the new recognition results is already registered in the result management table, the result creating unit 105 updates both the appearance frequency and the latest utterance time.

(Variation)

The client recognition dictionary 102 can contain both variable and non-variable dictionaries. The variable dictionary can be updated by the dictionary update unit 107. On the other hand, the non-variable dictionary cannot be updated by the dictionary update unit 107. The non-variable dictionary registers the vocabularies which are required to respond quickly such as commands to activate another application.

The dictionary update unit 107 updates the non-variable dictionary by utilizing vocabularies of the history of the recognition result which are not registered in the non-variable dictionary. In this way, the dictionary update unit 107 can register the vocabularies uttered lately to the client recognition dictionary 102 by keeping the condition that the vocabularies which are required to respond, quickly are registered in the client recognition dictionary 102.

(Effect)

The apparatus according to this embodiment executes its recognition process without utilizing network connection and also makes the server execute recognition process. When the apparatus generates a recognition result by its recognition process, the apparatus outputs the recognition result to the user without waiting to receive a recognition result from the server. Moreover, the apparatus according to this embodiment updates its recognition dictionary so that vocabularies which are lately uttered by the user are become recognizable by the recognition process of the apparatus itself. Accordingly, the apparatus can improve response speed as well as recognition accuracy.

The Second Embodiment

The second embodiment explains about a speech recognition apparatus which has a function to display the recognition result including more than one candidate to the user. The user can activate an application or search for content by selecting the correct result from among the candidates.

First, the apparatus according to this embodiment displays the recognition result of the client recognition unit 110 to the user as a primary recognition result. The primary recognition result includes top L candidates (L is more than one). Then, after receiving the recognition result from the server 300, the apparatus displays a secondary recognition result to the user which is generated by replacing at least one of the top L candidates other than the first candidate of the primary recognition result with the recognition result from the server 300. Accordingly, the apparatus can improve response speed as well as recognition accuracy.

Both the hardware component and the block function of the apparatus according to this embodiment are the same as the apparatus 100 according to the first embodiment.

(Flow chart)

Figure 10:
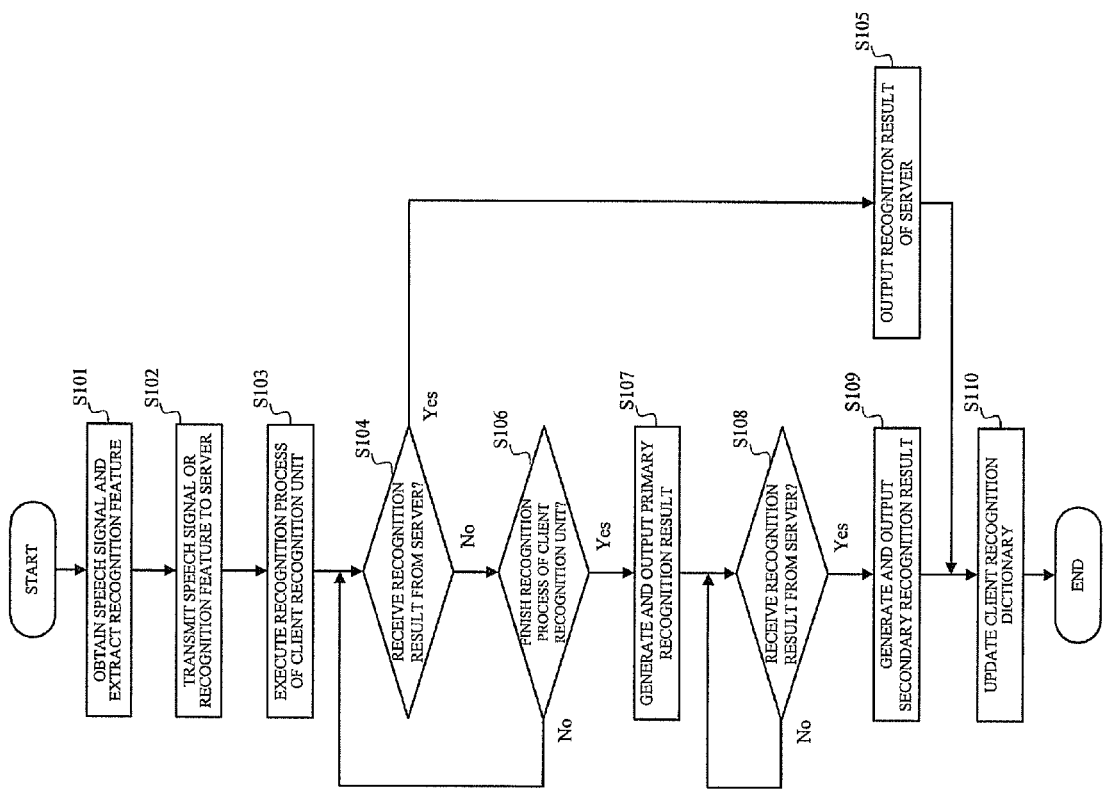
FIG. 10 is a system diagram of a flow chart illustrating processing of the apparatus according to the second embodiment.

FIG. 10 is a flow chart of processing of the apparatus 100 according to this embodiment. In this embodiment, the client recognition unit 110 generates the recognition result including the top L candidates based on the confidence score.

The process of the steps from S101 to S103 and S100 is the same as the first embodiment.

At S104, the result generating unit 105 judges whether or not the client receiving unit 104 receives the recognition result from the server 300. If the client receiving unit 104 receives the recognition result, the process moves to S105.

At S105, the result generating unit 105 utilizes the recognition result from the server 300 as the recognition result which is outputted to the user. The output unit 108 displays the recognition result from the result generation unit 105 on the display 208.

If the client receiving unit 104 does not receive the recognition result from the server 300 ("No" at S104), the process moves to S106.

At S106, the client recognition unit 110 judges whether or not the client recognition unit 110 finishes its recognition process. If the recognition process is not finished, the process moves to S104 and checks the reception status of the recognition result of the server 300. Otherwise, the process moves to S107.

At S107, the result generating unit 105 utilizes the recognition result of the client recognition unit 110 as the primary recognition result which the apparatus 100 outputs. Then, the output unit 108 displays the primary recognition result on display 208.

At S108, the results generating unit 105 judges whether or not the client receiving unit 104 receives the recognition result from the server 300. If the client receiving unit 104 does not receive the recognition result, the client receiving unit 104 waits until it receives the recognition result from the server 300. Otherwise, the process moves to S109.

At S109, the result generating unit 105 generates the secondary recognition result by replacing the candidates of the primary recognition result which are lower than the first candidate with the recognition result of the server 300. Then, the output unit 108 displays the secondary recognition result on display 208 after outputting the primary one.

If the recognition result of the server 300 also includes the same candidate as the first candidate of the primary recognition result (for example, "ACTOR A"), the result generating unit 105 generates the secondary recognition result by utilizing the recognition result of the server 300 other than the same candidate ("ACTOR A"). This is to avoid the situation that the secondary recognition result includes the same candidates redundantly.

Figure 11:
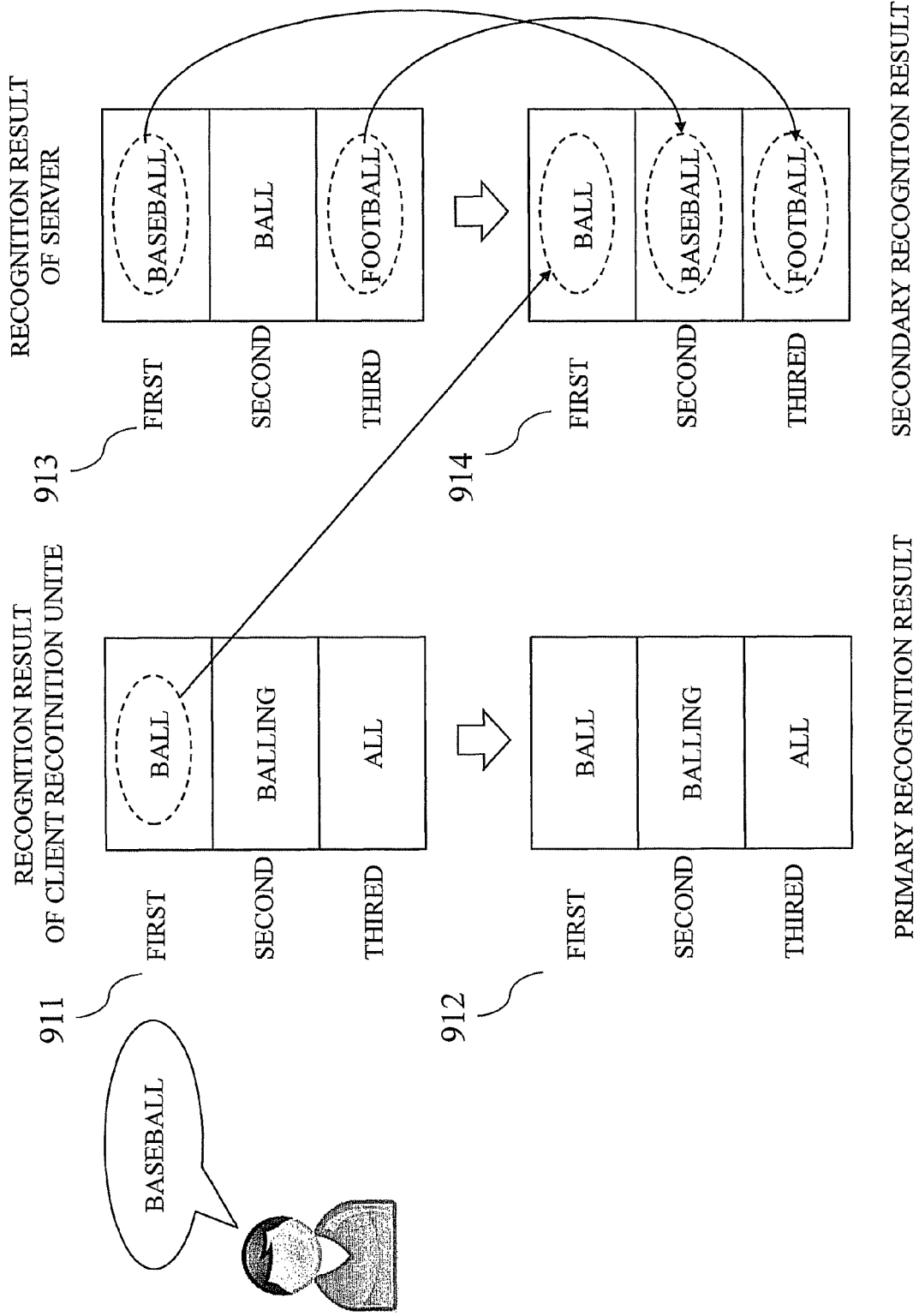
FIG. 11 is an example of output by the apparatus.

FIG. 11 is an example of output by the apparatus 100. In this example, the user utters "BASEBALL" to the apparatus 100.

First, the client recognition unit 110 generates the recognition result 911 (the first, the second and the third candidate is "BALL", "BALLING" and "ALL", respectively). The recognition result 911 is displayed on the display 208 as the primary recognition result 912. At this point, the client receiving unit 104 does not receive the recognition result from the server 300.

When the client receiving unit 104 receives the recognition result 913 (the first, the second and the third candidate is "BASEBALL", "BALL" and "FOOTBALL", respectively) from the server 300, the result generating unit 105 generates the secondary recognition result 914.

Here, the result generating unit 105 generates the secondary recognition result 914 by replacing the candidates of the primary recognition result 912 which are lower than the first candidate with the recognition result of the server 300 other than the same candidate as the first candidate of the primary recognition result. Then, the output unit 108 outputs the secondary recognition result on the display 208 after outputting the primary recognition result.

Generally, it is better to utilize the recognition result of the server 300 in terms of the recognition accuracy. On the other hand, it is better to utilize the recognition result of the client recognition unit 110 in order to achieve quick response.

(Effect)

The apparatus 100 according to this embodiment displays the recognition result of the client recognition unit 110 to the user as a primary recognition result. The primary recognition result includes top L candidates (L is more than one). Then, after receiving the recognition result from the server 300, the apparatus displays a secondary recognition result to the user which is generated by replacing at least one of the top L candidates other than the first candidate of the primary recognition result with the recognition result from the server 300. Accordingly, the apparatus can improve response speed as well as recognition accuracy.

In this embodiment, the result generating unit 105 does not replace the first candidate of the primary recognition result. Therefore, the result generating unit 105 does not obstruct the interaction between the user and the apparatus 100. When the user judges that the primary recognition result is not correct, the user can select the correct result from the secondary recognition result which is including the recognition result generated by the server 300 with high computing power.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any non-transitory computer readable medium or computer readable storage medium, which is configured to store a computer program for causing a computer to perform the processing described above, can be used.

Furthermore, based on an indication of the program installed from the memory device to the computer, OS (operation system) operating on the computer, or MW (middle ware software), such as database management software or network, can execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices can be included in the memory device.

A computer can execute each processing stage of the embodiments according to the program stored in the memory device. The computer can be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the invention. Indeed, the novel embodiments described herein may be embodied in a variety of other forms, furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An apparatus for speech recognition, comprising:
a recognition unit configured to recognize a speech signal by utilizing a client recognition dictionary and to generate a first recognition result, the client recognition dictionary including vocabularies recognizable in the recognition unit;
a transmitting unit configured to transmit at least one of the speech signal and a recognition feature extracted from the speech signal to a server before the first recognition result is generated by the recognition unit;
a receiving unit configured to receive a second recognition result from the server, the second recognition result being generated by the server;
a result generating unit configured to generate a third recognition result, the third recognition result being generated by utilizing the first recognition result when the first recognition result is generated before receiving the second recognition result, otherwise by at least utilizing the second recognition result;
a result storage unit configured to store the third recognition result;
a dictionary update unit configured to update, by utilizing a history of the third recognition result, the client recognition dictionary
so that the client recognition dictionary includes a first vocabulary prior to a second vocabulary in the case that the history of the third recognition result includes both the first and the second vocabularies and the second vocabulary is generated before the first vocabulary,
wherein the client recognition dictionary comprises a variable and a non-variable dictionaries, the variable dictionary being updatable by the dictionary update unit, the non-variable dictionary being non-updatable by the dictionary update unit, the recognition unit recognizes the speech signal by utilizing both the variable and the non-variable dictionaries, the dictionary update unit updates the variable dictionary,
wherein the dictionary update unit updates the client recognition dictionary by utilizing a vocabulary of the third recognition result which is not included in the non-variable dictionary, and
an output unit that outputs the third recognition result to a user;
wherein the result generating unit generates the third recognition result which includes top M candidates (M is greater than or equal to two) by utilizing the first recognition result when the first recognition result is generated before receiving the second recognition result, and generates a fourth recognition result when the result generating unit receives the second recognition result after generating the third recognition result, the fourth recognition result being generated by replacing at least one of the top M candidates other than a first candidate with the second recognition result, the output unit outputs the fourth recognition result to the user after outputting the third recognition result.

2. The apparatus according to claim 1, wherein the dictionary update unit updates the client recognition dictionary by utilizing last N of third recognition results (N is counting number) stored in the result storage unit.

3. The apparatus according to claim 1, wherein the result storage unit stores the third recognition result with a time information indicating a time when the third recognition result is generated, the dictionary update unit updates the client recognition dictionary by utilizing the third recognition result having a time information after a certain time.

4. The apparatus according to claim 1, wherein the dictionary update unit calculates an appearance frequency of a vocabulary of the third recognition result, and updates the client recognition dictionary so that the client recognition dictionary includes a vocabulary having an appearance frequency exceeding a certain threshold.

5. The apparatus according to claim 1, wherein the recognition unit generates the first recognition result with a confidence score representing a likelihood of the first recognition result, the result generating unit generates the third recognition result by utilizing the first recognition result when the first recognition result is created before receiving the second recognition result and the confidence score of the first recognition result is greater than or equal to a certain threshold, otherwise by at least utilizing the second recognition result.

6. The apparatus of claim 1, wherein the history of the recognition results represents a list of the recognition results which are generated by the result generating unit.

7. A method for recognizing speech, comprising:
generating a first recognition result by recognizing a speech signal by utilizing a client recognition dictionary including vocabularies recognizable;
transmitting at least one of the speech signal and a recognition feature extracted from the speech signal to a server before the first recognition result is generated;
receiving a second recognition result from the server, the second recognition result being generated by the server;
generating a third recognition result, the third recognition result being generated by utilizing the first recognition result when the first recognition result is generated before receiving the second recognition result, otherwise by at least utilizing the second recognition result;
updating, by utilizing a history of the third recognition result, the client recognition dictionary
so that the client recognition dictionary includes a first vocabulary prior to a second vocabulary in the case that the history of the third recognition result includes both the first and the second vocabularies and the second vocabulary is generated before the first vocabulary,
wherein the client recognition dictionary comprises a variable and a non-variable dictionaries, the variable dictionary being updatable by the dictionary update unit, the non-variable dictionary being non-updatable by the dictionary update unit, recognizing the speech signal by utilizing both the variable and the non-variable dictionaries, and updating the variable dictionary,
updating the client recognition dictionary by utilizing a vocabulary of the third recognition result which is not included in the non-variable dictionary,
outputting the third recognition result to a user, wherein
the third recognition result is generated to include top M candidates (M is greater than or equal to two) by utilizing the first recognition result, when the first recognition result is generated before receiving the second recognition result,
the method further comprising:
generating a fourth recognition result when the second recognition result is received after the third recognition result is generated, the fourth recognition result being generated by replacing at least one of the top M candidates other than a first candidate with the second recognition result; and
outputting the fourth recognition result to the user after the outputting the third recognition result.

8. The method of claim 7, wherein the history of the recognition results represents a list of the generated recognition results.

* * * * *